(12) United States Patent
Soemo et al.

(10) Patent No.: US 8,660,847 B2
(45) Date of Patent: Feb. 25, 2014

(54) INTEGRATED LOCAL AND CLOUD BASED SPEECH RECOGNITION

(75) Inventors: Thomas M. Soemo, Redmond, WA (US); Leo Soong, Kirkland, WA (US); Michael H. Kim, Redmond, WA (US); Chad R. Heinemann, Lynnwood, WA (US); Dax H. Hawkins, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 13/224,778

(22) Filed: Sep. 2, 2011

(65) Prior Publication Data

US 2013/0060571 A1    Mar. 7, 2013

(51) Int. Cl.
*G10L 15/00*    (2013.01)

(52) U.S. Cl.
USPC ........................................ 704/251; 704/233

(58) Field of Classification Search
USPC ........................................................ 704/251
See application file for complete search history.

(56) References Cited

U.S. PATENT DOCUMENTS

| | | | | |
|---|---|---|---|---|
| 6,122,613 A * | 9/2000 | Baker | ........................... | 704/235 |
| 6,405,170 B1 * | 6/2002 | Phillips et al. | ................ | 704/270 |
| 6,519,562 B1 * | 2/2003 | Phillips et al. | ................ | 704/240 |
| 6,970,796 B2 | 11/2005 | Tashev | | |
| 7,203,323 B2 | 4/2007 | Tashev | | |
| 7,394,907 B2 | 7/2008 | Tashev | | |
| 7,415,117 B2 | 8/2008 | Tashev | | |
| 7,487,056 B2 | 2/2009 | Tashev | | |
| 7,515,721 B2 | 4/2009 | Tashev | | |
| 7,606,444 B1 * | 10/2009 | Erol et al. | ..................... | 382/305 |
| 7,672,931 B2 | 3/2010 | Hurst-Hiller | | |
| 7,809,564 B2 | 10/2010 | Jaiswal | | |
| 7,873,349 B1 | 1/2011 | Smith | | |
| 2004/0001137 A1 | 1/2004 | Cutler | | |
| 2006/0036438 A1 | 2/2006 | Chang | | |
| 2006/0210089 A1 | 9/2006 | Tashev | | |
| 2007/0050191 A1 | 3/2007 | Weider | | |
| 2007/0265850 A1 | 11/2007 | Kennewick | | |
| 2008/0059170 A1 | 3/2008 | Bloebaum | | |
| 2008/0154611 A1 | 6/2008 | Evermann | | |

(Continued)

OTHER PUBLICATIONS

Franz, "Searching the Web by Voice,"—Published Date: Sep. 1, 2002 http://people.csail.mit.edu/milch/papers/gvs.pdf.

(Continued)

*Primary Examiner* — Jialong He
*Assistant Examiner* — Jie Shan
(74) *Attorney, Agent, or Firm* — Judy Yee; David Andrews; Micky Minhas

(57) ABSTRACT

A system for integrating local speech recognition with cloud-based speech recognition in order to provide an efficient natural user interface is described. In some embodiments, a computing device determines a direction associated with a particular person within an environment and generates an audio recording associated with the direction. The computing device then performs local speech recognition on the audio recording in order to detect a first utterance spoken by the particular person and to detect one or more keywords within the first utterance. The first utterance may be detected by applying voice activity detection techniques to the audio recording. The first utterance and the one or more keywords are subsequently transferred to a server which may identify speech sounds within the first utterance associated with the one or more keywords and adapt one or more speech recognition techniques based on the identified speech sounds.

19 Claims, 13 Drawing Sheets

(56) References Cited

U.S. PATENT DOCUMENTS

| | | | |
|---|---|---|---|
| 2008/0232607 A1 | 9/2008 | Tashev | |
| 2008/0243497 A1 | 10/2008 | Tashev | |
| 2008/0288219 A1 | 11/2008 | Tashev | |
| 2008/0304677 A1* | 12/2008 | Abolfathi et al. | 381/71.1 |
| 2009/0204410 A1* | 8/2009 | Mozer et al. | 704/275 |
| 2009/0220065 A1* | 9/2009 | Ahuja et al. | 379/202.01 |
| 2009/0300520 A1* | 12/2009 | Ashutosh et al. | 715/756 |
| 2009/0306981 A1* | 12/2009 | Cromack et al. | 704/235 |
| 2010/0069123 A1 | 3/2010 | Ararandian | |
| 2010/0076763 A1 | 3/2010 | Ouchi | |
| 2011/0035666 A1* | 2/2011 | Geisner et al. | 715/709 |
| 2011/0304774 A1* | 12/2011 | Latta et al. | 348/699 |
| 2012/0206561 A1* | 8/2012 | Huang | 348/14.09 |
| 2012/0224714 A1* | 9/2012 | Couse et al. | 381/92 |
| 2013/0024819 A1* | 1/2013 | Rieffel et al. | 715/848 |

OTHER PUBLICATIONS

PCT International Search Report dated Jan. 28, 2013, PCT Patent Application No. PCT/US2012/053257.

PCT Written Opinion of the International Searching Authority dated Jan. 28, 2013, PCT Patent Application No. PCT/US2012/053257.

* cited by examiner

US 8,660,847 B2

INTEGRATED LOCAL AND CLOUD BASED SPEECH RECOGNITION

BACKGROUND

Speech recognition techniques may be used to convert spoken words or phrases into text. Statistically-based speech recognition techniques typically utilize acoustic modeling and/or language modeling. An acoustic model may be created by taking various audio recordings of speech (e.g., various words or phrases), associating the various audio recordings with text transcriptions, and then creating statistical representations of the sounds that make up each of the various words or phrases. A language model tries to capture the properties of a particular language and to predict the next word or phrase in a speech sequence. The language model may include the frequency of words and/or the probabilities of sequences of words within the particular language.

SUMMARY

Technology is described for integrating local speech recognition with cloud-based speech recognition in order to provide an efficient natural user interface. In some embodiments, a computing device determines a direction associated with a particular person within an environment and generates an audio recording associated with the direction in which sounds originating from the direction are amplified and sounds originating from other directions are suppressed. The computing device then performs local speech recognition on the audio recording in order to detect a first utterance spoken by the particular person and to detect one or more keywords within the first utterance. The first utterance may be detected by applying voice activity detection techniques to the audio recording. The first utterance and the one or more keywords are subsequently transferred to a server which may identify speech sounds within the first utterance associated with the one or more keywords and adapt one or more speech recognition techniques based on the identified speech sounds.

One embodiment includes acquiring one or more sounds from a plurality of microphones associated with a first environment, determining one or more directions within the first environment associated with one or more persons, and generating one or more audio recordings based on the one or more sounds, wherein each of the one or more audio recordings is associated with a different direction of the one or more directions. The method further includes performing local speech recognition on each of the one or more audio recordings including detecting a first utterance and detecting one or more keywords within the first utterance. The method further includes transmitting the first utterance and the one or more keywords to a second computing device and receiving a first response from the second computing device based on the first utterance.

One embodiment includes a capture device and one or more processors. The capture device includes a plurality of microphones. The capture device acquires one or more sounds from the plurality of microphones associated with a first environment. The one or more processors determine one or more directions within the first environment associated with one or more persons. The one or more processors generate one or more audio recordings based on the one or more sounds, wherein each of the one or more audio recordings is associated with a different direction of the one or more directions. The one or more processors detect a first utterance within a first audio recording of the one or more audio recordings and detect one or more keywords within the first utterance. The one or more processors transmit the first utterance and the one or more keywords to a second computing device, wherein the second computing device detects one or more words within the first utterance based on the one or more keywords. The one or more processors receive a first response from the second computing device based on the first utterance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is described for integrating local speech recognition with cloud-based speech recognition in order to provide an efficient natural user interface. In some embodiments, a computing device determines a direction associated with a particular person within an environment and generates an audio recording associated with the direction in which sounds originating from the direction are amplified and sounds originating from other directions are suppressed. The computing device then performs local speech recognition on the audio recording in order to detect a first utterance spoken by the particular person and to detect one or more keywords within the first utterance. The first utterance may be detected by applying voice activity detection techniques to the audio recording. The first utterance and the one or more keywords are subsequently transferred to a server which may identify speech sounds within the first utterance associated with the one or more keywords and adapt one or more speech recognition techniques based on the identified speech sounds.

There are several benefits to integrating local speech recognition with cloud-based speech recognition. One benefit is utilizing the greater processing power and storage capacity of cloud computing. For example, cloud-based speech recognition may leverage large-scale machine learning and larger acoustic models as compared with local speech recognition which is typically constrained by power and/or form factor constraints. Performing local speech recognition prior to cloud-based speech recognition also conserves network bandwidth as the local speech recognizer may filter unnecessary or unintended requests sent to the cloud for processing. For example, a local speech recognizer may initiate a cloud-based speech recognizer only upon detection of one or more keywords included within a local keyword file (i.e., a predetermined lexicon of words). Another benefit of cloud-based speech recognition is the ability to leverage large dynamic catalogs with up-to-date grammars (e.g., updated keywords associated with the latest episode of a particular TV show).

Figure 1:
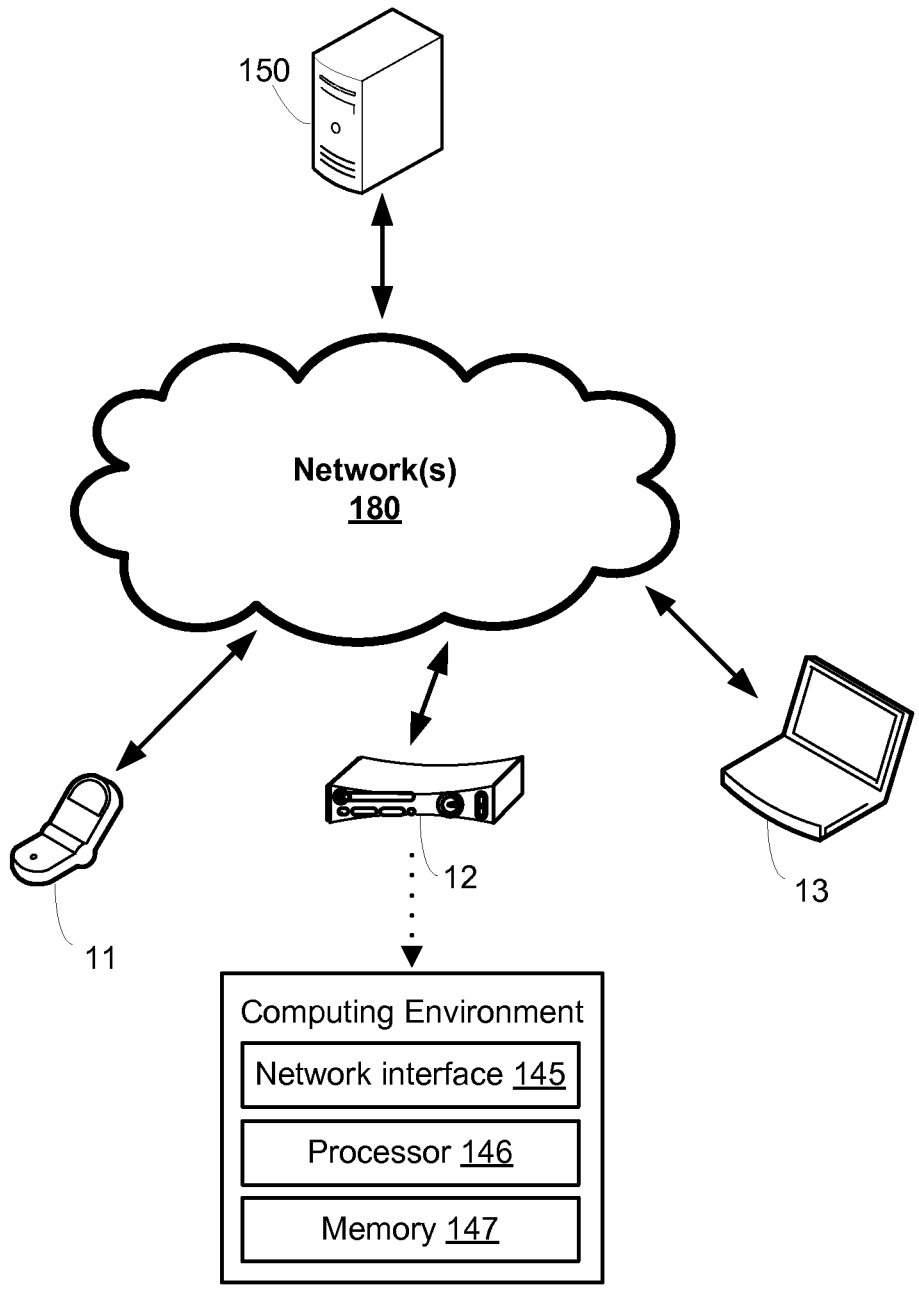
FIG. 1 is a block diagram of one embodiment of a networked computing environment in which the disclosed technology may be practiced.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include computing environment 12, mobile device 11, computer 13, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of computing environment 12 includes network interface 145, processor 146, and memory 147, all in communication with each other. Network interface 145 allows computing environment 12 to connect to one or more networks 180. Network interface 145 may include a wireless network interface, a modem, and/or a wired network interface. Processor 146 allows computing environment 12 to execute computer readable instructions stored in memory 147 in order to perform processes discussed herein. In one example, computing environment 12 may comprise a gaming console.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one embodiment, application server 150 may receive an audio file and one or more keywords from computing environment 12. The application server 150 may identify one or more speech sounds within the audio file associated with the one or more keywords. Subsequently, application server 150 may adapt a cloud-based speech recognition technique based on the one or more speech sounds, perform the cloud-based speech recognition technique on the audio file, and transmit one or more words identified within the audio file to computing environment 12.

Figure 2:
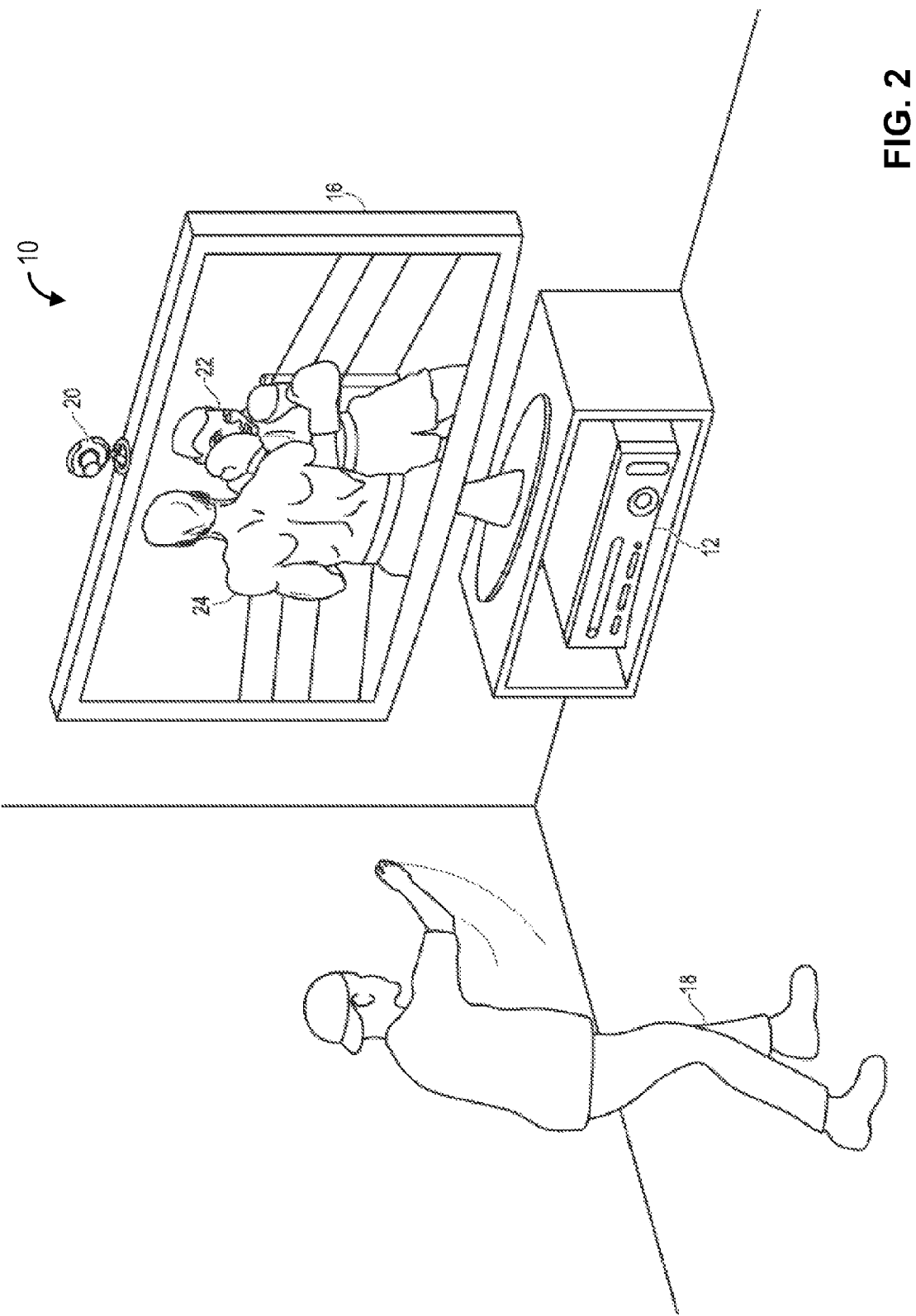
FIG. 2 depicts one embodiment of a target detection and tracking system with a user playing a boxing game.

FIG. 2 depicts one embodiment of a target detection and tracking system 10 including a computing environment 12 and a capture device 20. The target detection and tracking system 10 may be used to detect, recognize, analyze, and/or track human targets, such as user 18, and/or non-human targets, such as a prop held by user 18 (not shown). Target detection and tracking system 10 may include a depth detection system for generating a depth map of the place space environment in which user 18 exists.

As depicted, the target detection and tracking system 10 may include a computing environment 12. The computing environment 12 may include a computer, a gaming system or console, or the like. In one embodiment, the computing environment 12 may include hardware components and/or software components such that the computing environment 12 may be used to execute an operating system and applications such as gaming applications, non-gaming applications, or the like. In one embodiment, computing environment 12 may include a processor such as a standardized processor, a specialized processor, a microprocessor, or the like that may execute instructions stored on a processor readable storage device for performing the processes described herein.

The target detection and tracking system 10 may further include a capture device 20. The capture device 20 may include one or more microphones for capturing or recording sounds and one or more cameras for capturing or recording images. In one embodiment, capture device 20 may include a camera that may be used to visually monitor one or more targets including one or more users, such as the user 18. Gestures (including poses) performed by the one or more users may be captured, analyzed, and tracked to perform one or more controls or actions for the user-interface of an operating system or application. In some embodiments, the capture device 20 may include a depth sensing camera.

Through moving his or her body, a user may create gestures. A gesture may comprise a motion or pose by the user that may be captured as image data and parsed for meaning. A gesture may be dynamic, comprising a motion, such as mimicking throwing a ball. A gesture may be a static pose, such as holding one's forearms crossed. A gesture may also incorporate props, such as swinging a mock sword.

Capture device 20 may capture image and audio data relating to one or more users and/or objects. For example, capture device 20 may be used to capture information relating to partial or full body movements, gestures, and speech of one or more users. The information captured by capture device 20 may be received by computing environment 12 and/or a processing element within capture device 20 and used to render, interact with, and control aspects of a gaming or other application. In one example, capture device 20 captures image and audio data relating to a particular user and computing environment 12 processes the captured information to identify the particular user by executing facial and voice recognition software.

In some embodiments, target detection and tracking system 10 may generate and utilize a depth map for detecting and/or tracking objects in an environment. The depth map may comprise an image or frame of an environment that includes depth information associated with the environment. In one example, the depth image may include a plurality of observed pixels where each observed pixel has an associated depth value. For example, each pixel may include a depth value such as a length or distance to an object in the environment from the point of view of the capture device.

The target detection and tracking system 10 may be connected to an audiovisual device 16 such as a television, a monitor, or a high-definition television (HDTV) for providing game or application visuals and/or audio to a user such as user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. The audiovisual device 16 may be connected to the computing environment 12 via, for example, an S-Video cable, a coaxial cable, an HDMI cable, a DVI cable, a VGA cable, or the like.

As shown in FIG. 2, the application executing on the computing environment 12 may be a boxing game that the user 18 may be playing. The computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, the user 18 may throw a punch in physical space to cause the player avatar 24 to throw a punch in game space. In one embodiment, the computer environment 12 and the capture device 20 of the target detection and tracking system 10 may be used to recognize and analyze the punch of the user 18 in physical space such that the punch may be interpreted as a game control of the player avatar 24 in game space.

In one embodiment, a user's movements may be interpreted as controls that may correspond to actions other than controlling the player avatar 24. For example, the user 18 may use particular movements to end a game, pause a game, save a game, select a level, view high scores, or communicate with a friend. In another embodiment, target detection and tracking system 10 interprets a target's movements as operating system and/or application controls that are outside the realm of games. For example, virtually any controllable aspect of an operating system and/or application may be controlled by movements of the target such as the user 18. In another embodiment, the user 18 may use movements to select the game or other application from a main user interface. A full range of motion of the user 18 may be available, used, and analyzed in any suitable manner to interact with an application or operating system.

Suitable examples of a target detection and tracking system 10 and components thereof are found in the following co-pending patent applications, all of which are herein incorporated by reference in their entirety: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

Figure 3:
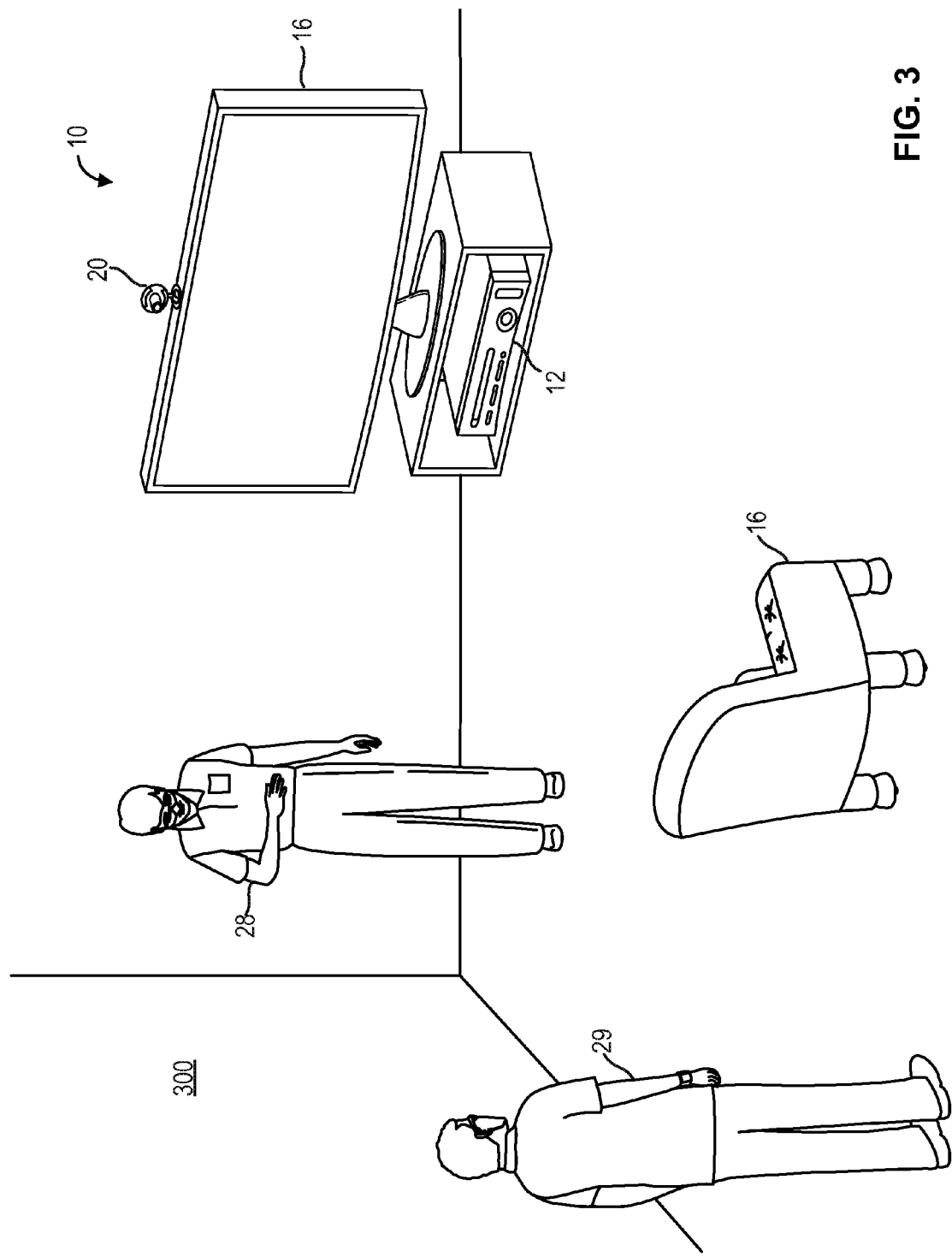
FIG. 3 depicts one embodiment of a target detection and tracking system and an environment within a field of view of a capture device associated with the target detection and tracking system.

FIG. 3 depicts one embodiment of a target detection and tracking system 10 and an environment 300 within a field of view of capture device 20. The environment 300 includes persons 28 and 29 and a non-human object (chair 16). As depicted, person 28 is closer to capture device 20 than person 29. Person 28 is also associated with a different direction (or angle) than person 29 from the point of view of the capture device 20. In some embodiments, target detection and tracking system 10 determines a first direction (e.g., via sound source localization) within the environment 300 associated with person 28 and a second direction within the environment 300 associated with person 29. The first direction and the second direction may each be identified by a particular direction (or angle) with respect to reference coordinates associated with the capture device 20. A particular direction may also be identified by a set of coordinates associated with the particular direction within the environment 300.

Once the first direction and the second direction are determined, target detection and tracking system 10 may generate a first audio recording associated with the first direction and a second audio recording associated with the second direction. The first audio recording and the second audio recording may each be generated using beamforming techniques. The beamforming techniques may be applied to sounds associated with a plurality of microphones such that the plurality of microphones acts as a single highly directional microphone (i.e., sounds originating within a particular range of directions are amplified while sounds originating outside the particular range of directions are attenuated). These techniques allow sounds originating from person 28 to be focused upon while sounds originating from person 29 are suppressed. The beamforming techniques may be implemented in either hardware or software, and may be performed in parallel (i.e., parallel processing of both the first audio recording and the second audio recording may be performed).

Once a particular audio recording has been generated (e.g., the first audio recording), the target detection and tracking system 10 may perform local speech recognition on the particular audio recording. Local speech recognition may include detecting a first utterance spoken by a particular person (e.g., person 28) and detecting one or more keywords within the first utterance. The first utterance may include a complete unit of speech associated with the particular person. For example, the first utterance may include a spoken sentence.

In one embodiment, the beginning of the first utterance may be identified by detecting one or more keywords spoken by person 28. After the first utterance and one or more keywords are identified, the target detection and tracking system 10 may transmit the first utterance and the one or more keywords to one or more servers via the Internet or other global network for speech recognition processing. The first utterance may be transmitted as an audio file. The one or more servers may respond with one or more words detected within the first utterance made by person 28. In one embodiment, the one or more servers may return text associated with the one or more words. In another embodiment, the one or more servers may perform an Internet search based on the one or more words and return the results.

In some embodiments, a cloud-based speech recognition engine may adapt speech recognition techniques performed by the cloud-based speech recognition engine based on speech sounds associated with the one or more keywords as pronounced within the first utterance.

Figure 4:
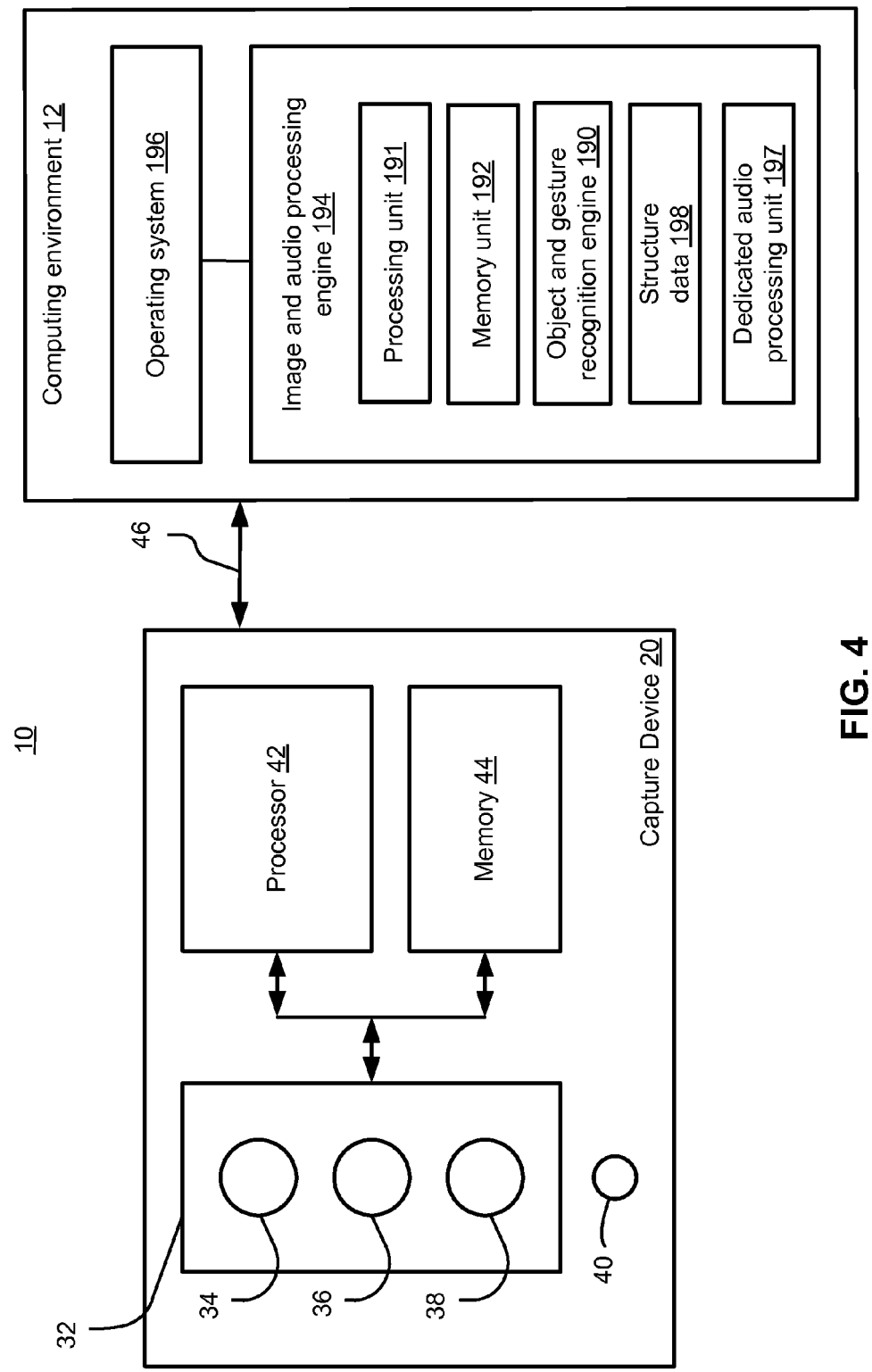
FIG. 4 illustrates one embodiment of a computing system including a capture device and a computing environment.

FIG. 4 illustrates one embodiment of a target detection and tracking system 10 including a capture device 20 and computing environment 12. In some embodiments, capture device 20 and computing environment 12 may be integrated within a single computing device. The single computing device may be a mobile device, such as mobile device 11 in FIG. 1.

In one embodiment, the capture device 20 may include one or more image sensors for capturing images and videos. An image sensor may comprise a CCD image sensor or a CMOS sensor. In some embodiments, capture device 20 may include an IR CMOS image sensor. The capture device 20 may also include a depth camera (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 4, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 illustrated in FIG. 4 are housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As shown in FIG. 4, computing environment 12 includes image and audio processing engine 194 in communication with operating system 196. Image and audio processing engine 194 includes dedicated audio processing unit 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Dedicated audio processing unit 197 processes audio signals acquired by capture device 20. The audio signal processing techniques may include acoustic echo cancellation, sound source localization, and beamforming techniques.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects, image and audio processing engine 194 may report to operating system 196 an identification of each object detected and a corresponding position and/or orientation.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing object recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 5A:
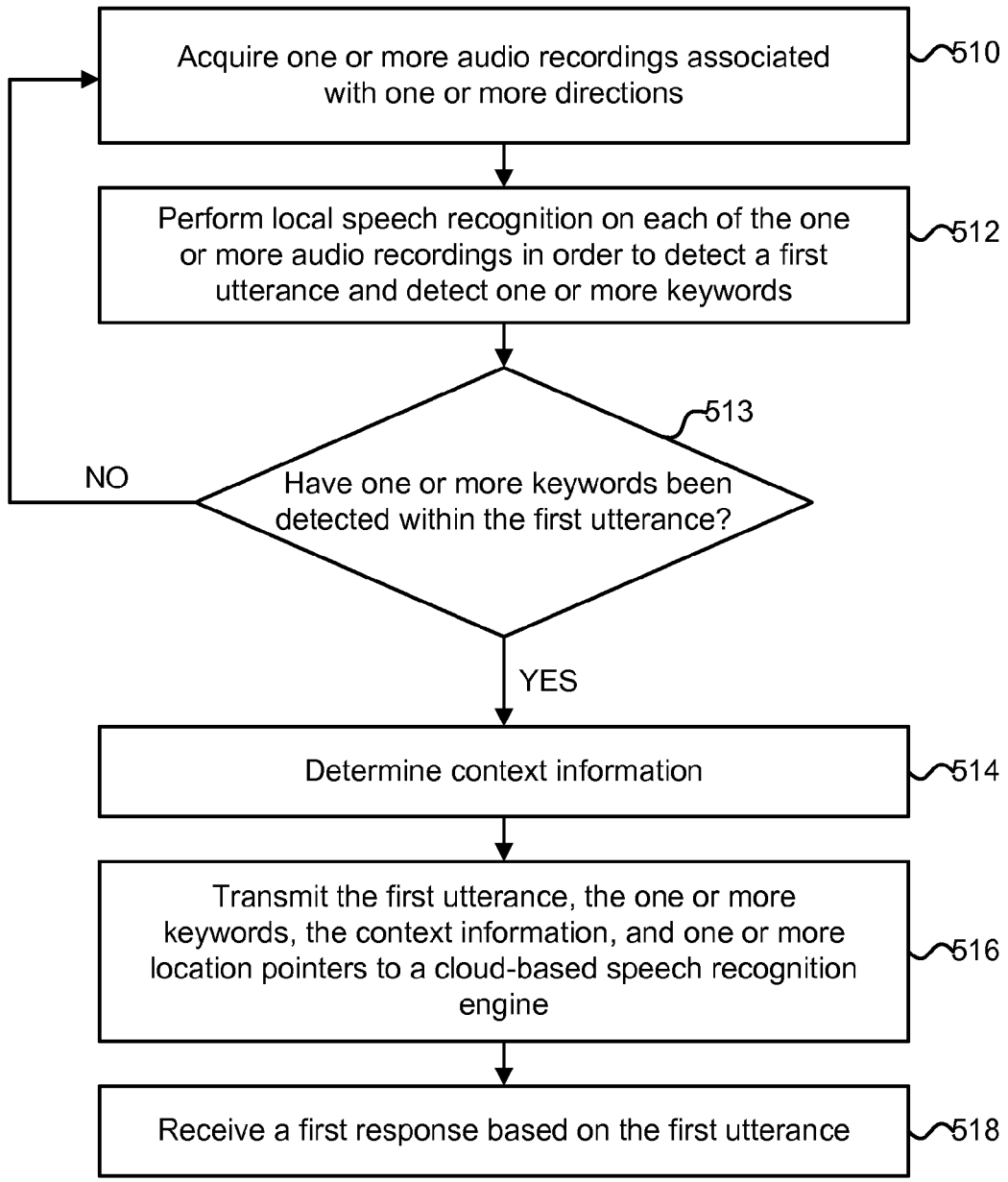
FIG. 5A is a flowchart describing one embodiment of a process for integrating local and cloud-based speech recognition.

FIG. 5A is a flowchart describing one embodiment of a process for integrating local and cloud-based speech recognition. The process of FIG. 5A may be performed continuously and by one or more computing devices. Each step in the process of FIG. 5A may be performed by the same or different computing devices as those used in other steps, and each step need not necessarily be performed by a single computing device. In one embodiment, the process of FIG. 5A is performed by a target detection and tracking system such as target detection and tracking system 10 in FIGS. 2-3.

In step 510, one or more audio recordings are acquired. Each of the one or more audio recordings may be associated with a different listening direction within a playspace or other environment. In one embodiment, a particular audio recording of the one or more audio recordings comprises only sounds originating from a particular direction. In step 512, local speech recognition is performed on each of the one or more audio recordings. The local speech recognition may include detecting a first utterance and detecting one or more keywords within the first utterance. An utterance may include a complete unit of speech associated with a particular person, and may generally but not always be bounded by silence lasting a predetermined duration. For example, an utterance may comprise a spoken phrase in which one second of silence exists before and after the spoken phrase. In one embodiment, the local speech recognition may be performed by a mobile device and may detect a first utterance associated with the speech of the particular person. The local speech recognition may also include determining one or more location pointers identifying locations of the one or more keywords within the first utterance.

In some embodiments, the one or more keywords detected in step 512 may be used for initiating a local action on a computing device. For example, if a movie application is running on a particular computing device and the keyword "pause" is detected, then the movie application may be paused on the particular computing device. In another embodiment, the one or more keywords detected in step 512 may be used for initiating a non-local action such as cloud-based speech recognition based on the one or more keywords.

In step 513, it is determined whether one or more keywords have been detected within the first utterance in step 512. If one or more keywords have not been detected, then step 510 is performed. In this case, if no keywords within an utterance are detected, then subsequent cloud-based speech processing is not performed. Otherwise, if one or more keywords have been detected, then step 514 is performed.

In step 514, context information is determined. In one embodiment, the context information may be associated with a particular computing device. For example, the particular computing device may comprise a mobile or non-mobile computing device performing the local speech recognition. The context information associated with the particular computing device may include an identification of a particular application running on the particular computing device. In one example, the particular application may include a game application or an online marketplace application. The context information associated with the particular computing device may also include geographical location information associated with the particular computing device (e.g., GPS coordinates).

In another embodiment, the context information may be associated with a particular person within the first environment. For example, the context information may include profile information associated with the particular person. The profile information may include interests of the particular person, friends or contacts of the particular person, and other personal information. The context information may also include calendar information associated with the particular person.

In step 516, the first utterance and the one or more keywords are transmitted to a second computing device. Context information determined in step 514 of FIG. 5A and one or more location pointers determined in step 512 of FIG. 5A may also be transmitted to the second computing device. In one embodiment, the second computing device may comprise a cloud-based speech recognition engine or an application server, such as application server 150 in FIG. 1. The first utterance may be transmitted via an audio file (e.g., a WAV file or an MP3 file) associated with the first utterance. The audio file may be created using an audio codec that converts received analog audio signals into a compressed or uncompressed digital representation. The one or more keywords may be transmitted via text information.

In step 518, a first response based on the first utterance is received. In one example, the first response may comprise text information associated with one or more words detected within the first utterance by the second computing device. In another example, the first response may include Internet search results based on the first utterance. The first response may also depend on the context information transmitted to the second computing device.

Figure 5B:
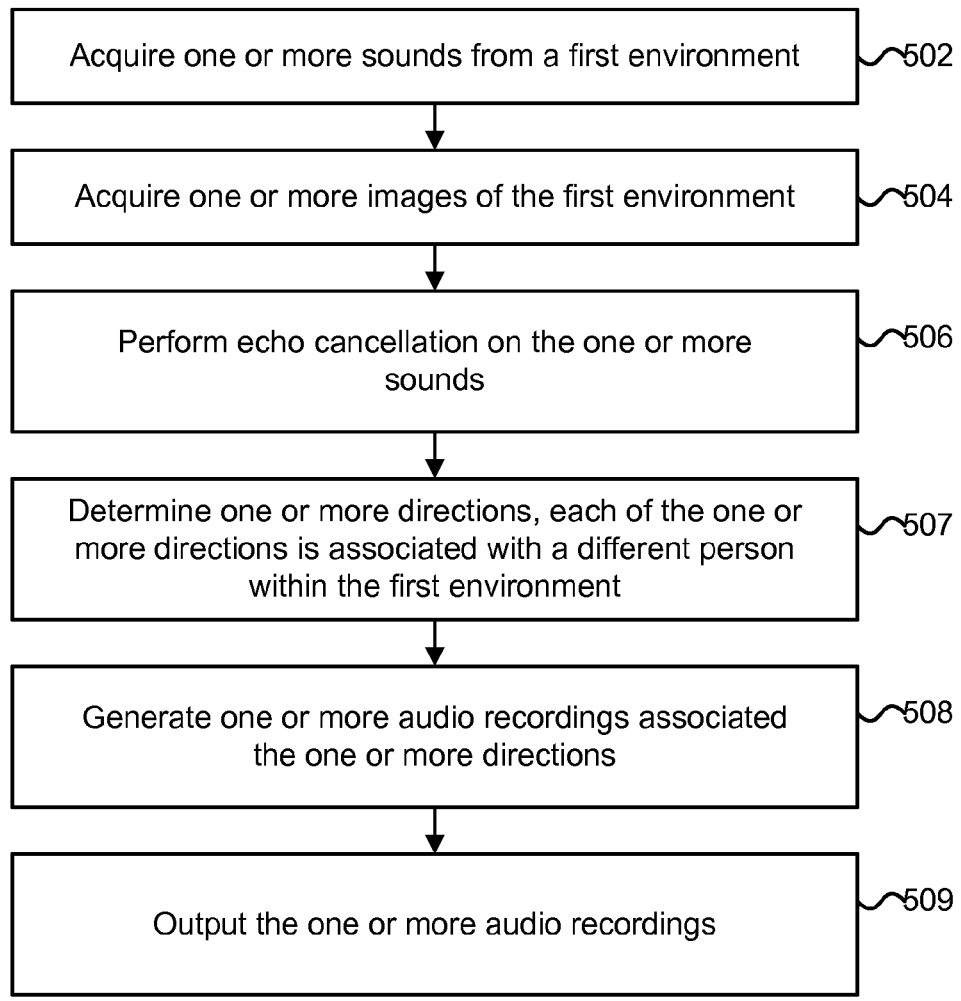
FIG. 5B is a flowchart describing one embodiment of a process for acquiring one or more audio recordings.

FIG. 5B is a flowchart describing one embodiment of a process for acquiring one or more audio recordings. The process described in FIG. 5B is one example of a process for implementing step 510 in FIG. 5A. The process of FIG. 5B may be performed continuously and by one or more computing devices. Each step in the process of FIG. 5B may be performed by the same or different computing devices as those used in other steps, and each step need not necessarily be performed by a single computing device. In one embodiment, the process of FIG. 5B is performed by a target detection and tracking system such as target detection and tracking system 10 in FIGS. 2-3.

In step 502, one or more sounds from a first environment are acquired. The one or more sounds may be acquired using one or more microphones, or a microphone array. The one or more microphones may be arranged in a predetermined layout and be used to capture sounds from various directions and/or originating from different points within an environment (e.g., speech sounds associated with an active speaker in a room). The one or more sounds may be captured as analog signals and digitized through the use of an analog-to-digital converter.

In step 504, one or more images of the first environment are acquired. The one or more images may include one or more depth images. In step 506, echo cancellation on the one or more sounds may be performed. In one embodiment, acoustic echo cancellation is used to remove sounds originating from one or more audio speakers. Echo cancellation may be used to suppress speech sounds and/or other sounds originating outside the first environment that are projected into the first environment through the one or more audio speakers. Noise suppression techniques may also be applied to the one or more sounds in order to remove background noise. In one example, a band-pass filter may be applied to the one or more sounds in order to remove background noise.

In step 507, one or more directions are determined. Each of the one or more directions is associated with a particular source of sound. In one embodiment, each of the one or more directions is associated with a different person of one or more persons within the first environment. Each of the one or more directions may be identified by a particular direction (or angle) and a degree of confidence as to the particular source of sound.

In one embodiment, the one or more directions may be determined using sound source localization. Sound source localization techniques may be used to localize the direction of a sound source by detecting time differences in the arrival time of different sounds due to the speed of sound being captured by a plurality of microphones. Sound source localization techniques may also include performing pattern matching on each of the audio signals received by each of the plurality of microphones. The one or more directions may be represented by a one-dimension localization (e.g., an angle representing a plane in which a particular source of sound is located), two-dimension localization (e.g., a vector representing an angle and an elevation), or a three-dimension localization (e.g., locating a point in three-dimension space associated with a particular source of sound).

In some embodiments, the one or more directions may be determined by performing skeletal tracking utilizing the one or more images acquired in step 504. For example, skeletal tracking may be used to detect one or more active skeletons within the first environment. Each of the one or more directions may be associated with a different skeleton of the one or more active skeletons. The one or more directions may also be determined by applying voice recognition techniques to the one or more sounds in order to identify the voice of a particular person. In one embodiment, a direction associated with a particular person may be tracked in real-time by applying both skeletal tracking and voice recognition. More information regarding skeletal tracking can be found in U.S. patent application Ser. No. 12/475,308, "Device for Identifying and Tracking Multiple Humans over Time," incorporated herein by reference in its entirety.

In step 508, one or more audio recordings based on the one or more sounds are generated. Each of the one or more audio recordings may be associated with a different direction of the one or more directions. In one embodiment, each of the one or more audio recordings includes audio information associated with a different person within the first environment.

In some embodiments, beamforming techniques may be performed in order to amplify sounds originating from a particular direction (or location) and to suppress sounds originating from other directions. Beamforming allows a plurality of microphones (e.g., comprising a microphone array) to function as a steerable directional microphone. In some cases, the beamforming techniques may include time shifting and combining audio signals associated with a plurality of microphones (e.g., delay and sum beamforming). The degree of time shifting may be based on a particular direction (or location) associated with a particular source of sound. Sound focusing techniques are particularly useful when more than one person is speaking at the same time within an environment.

In one embodiment, an audio recording will only be generated if a particular person is determined to be speaking in a particular direction (e.g., speaking towards a capture device). The direction of the particular person's head may be detected via image processing of the one or more images acquired in step 504.

In step 509, the one or more audio recordings generated in step 508 are outputted. In one embodiment, the one or more audio recordings are outputted to a local speech recognition engine for speech to text processing.

Figure 5C:
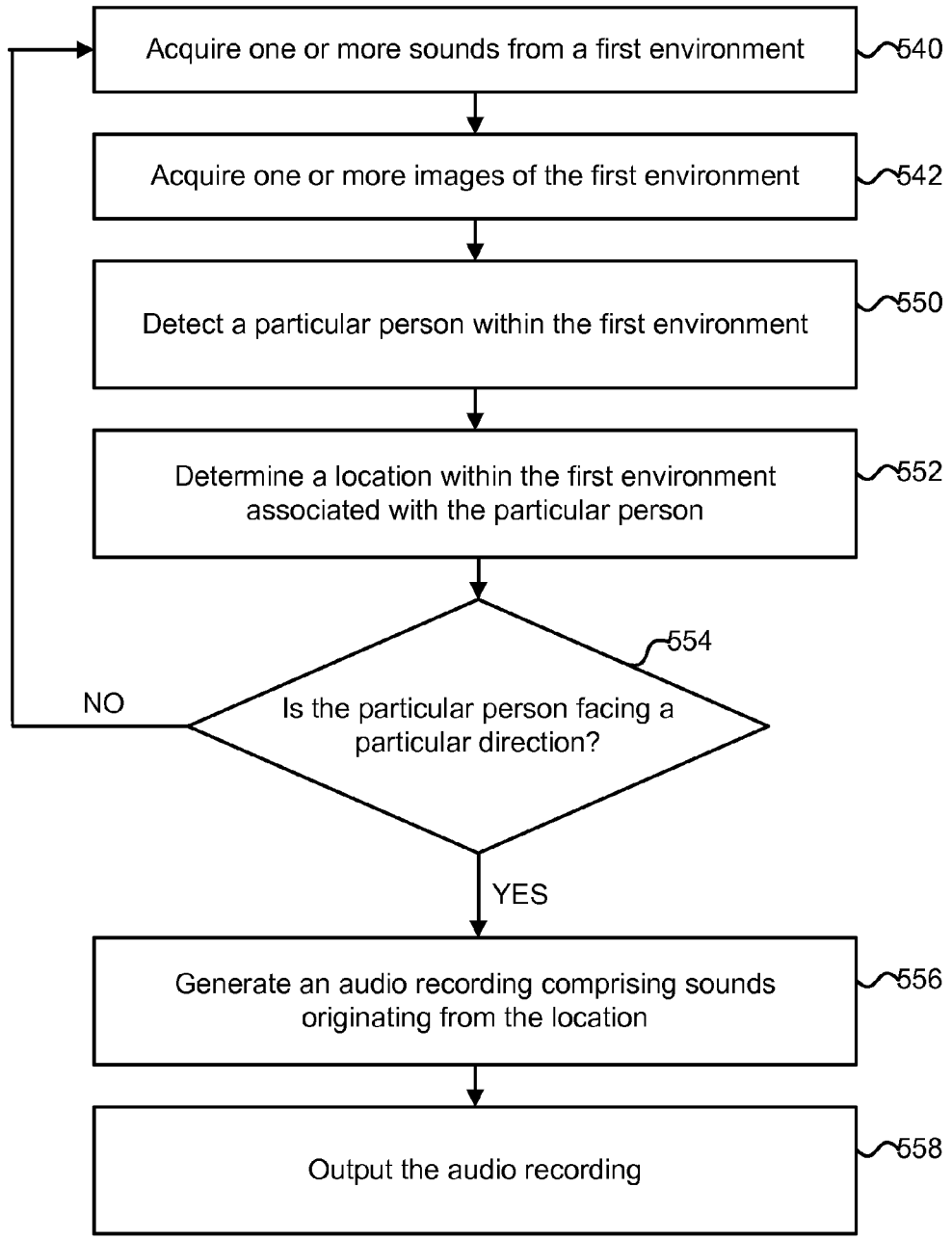
FIG. 5C is a flowchart describing one embodiment of a process for acquiring one or more audio recordings.

FIG. 5C is a flowchart describing one embodiment of a process for acquiring one or more audio recordings. The process described in FIG. 5C is another example of a process for implementing step 510 in FIG. 5A. The process of FIG. 5C may be performed continuously and by one or more computing devices. Each step in the process of FIG. 5C may be performed by the same or different computing devices as those used in other steps, and each step need not necessarily be performed by a single computing device. In one embodiment, the process of FIG. 5C is performed by a target detection and tracking system such as target detection and tracking system 10 in FIGS. 2-3.

In step 540, one or more sounds from a first environment are acquired. The one or more sounds may be acquired using one or more microphones, or a microphone array. In step 542, one or more images of the first environment are acquired. The one or more images may be acquired from a capture device, such as capture device 20 in FIGS. 2-3. The one or more images may include one or more color and/or depth images.

In step 550, a particular person is detected within the first environment. The particular person may be detected by applying object recognition techniques to the one or more images acquired in step 542. In some embodiments, the particular person may be detected (or identified) by applying facial recognition techniques to the one or more images acquired in step 542 and voice recognition techniques to the one or more sounds acquired in step 540. In step 552, a location within the first environment associated with the particular person is determined. The location may be represented by a single point in space in which the particular person exists within the first environment. In one embodiment, depth information from portions of the one or more images associated with the particular person may be used to determine the location associated with the particular person.

In step 554, it is determined whether the particular person is facing a particular direction. The direction of the particular person's face or body may be detected via image processing of the one or more images acquired in step 542. In one example, the particular person detected in step 550 is facing towards a capture device, such as capture device 20 in FIGS. 2-3. If the particular person is not facing in a particular direction, then step 540 is performed and no audio recording is generated. Otherwise, if the particular person is facing in a particular direction, then step 556 is performed.

In step 556, an audio recording comprising sounds originating from the location determined in step 552 is generated. The audio recording may comprise a subset of the one or more sounds acquired in step 540. In one embodiment, beamforming techniques are used to generate an audio recording that focuses on sounds originating from a particular direction in which the particular person exists. The audio recording may also be generated using the processes described with respect to step 508 of FIG. 5B.

In step 558, the audio recording generated in step 556 is outputted. In one embodiment, the audio recording is outputted to a local speech recognition engine for speech to text preprocessing before being transmitted to a cloud-based speech recognition engine.

Figure 5D:
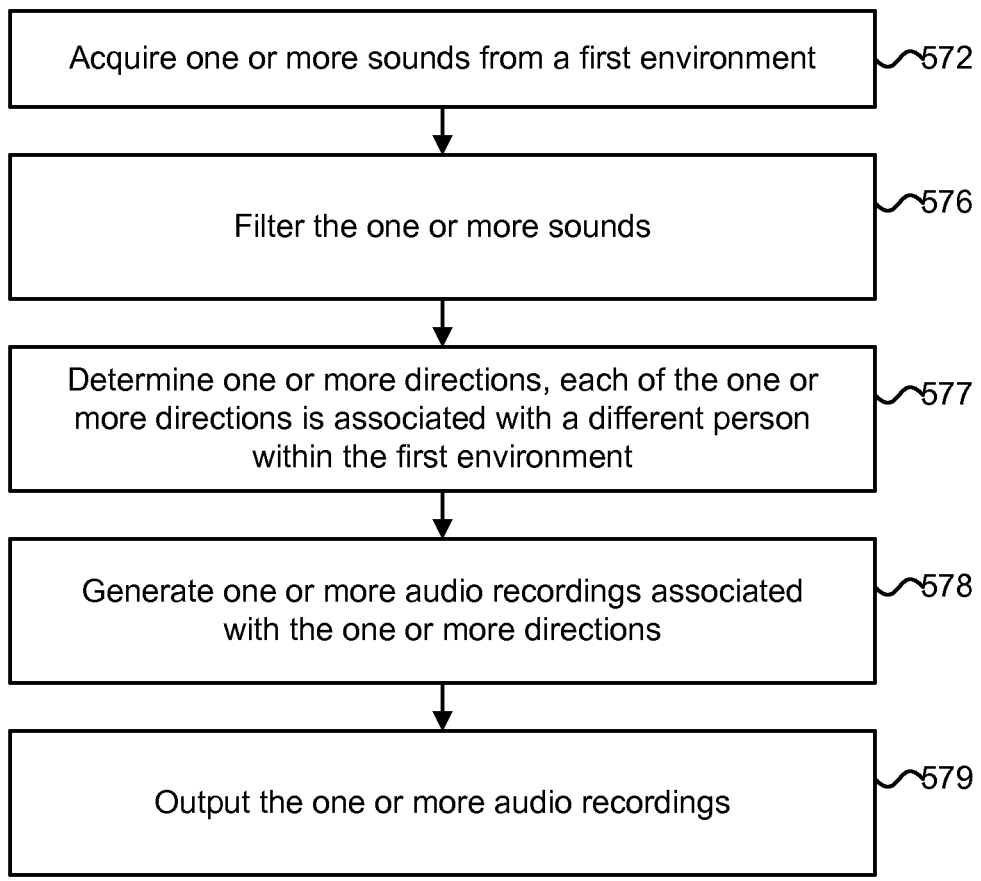
FIG. 5D is a flowchart describing one embodiment of a process for acquiring one or more audio recordings.

FIG. 5D is a flowchart describing one embodiment of a process for acquiring one or more audio recordings. The process described in FIG. 5D is another example of a process for implementing step 510 in FIG. 5A. The process of FIG. 5D may be performed continuously and by one or more computing devices. Each step in the process of FIG. 5D may be performed by the same or different computing devices as those used in other steps, and each step need not necessarily be performed by a single computing device. In one embodiment, the process of FIG. 5D is performed by a target detection and tracking system such as target detection and tracking system 10 in FIGS. 2-3.

In step 572, one or more sounds from a first environment are acquired. The one or more sounds may be acquired using one or more microphones, or a microphone array. The one or more microphones may be arranged in a predetermined layout and be used to capture sounds from various directions and/or originating from different points within an environment (e.g., speech sounds associated with an active speaker in a room). The one or more sounds may be captured as analog signals and digitized through the use of an analog-to-digital converter.

In step 576, the one or more sounds are filtered. In one embodiment, acoustic echo cancellation is used to remove sounds originating from one or more audio speakers. Echo cancellation may be used to suppress speech sounds and/or other sounds originating outside the first environment that are projected into the first environment through the one or more audio speakers. Noise suppression techniques may also be applied to the one or more sounds in order to remove background noise. In one example, a band-pass filter may be applied to the one or more sounds in order to remove background noise.

In step 577, one or more directions are determined. Each of the one or more directions is associated with a particular source of sound. In one embodiment, each of the one or more directions is associated with a different person of one or more persons within the first environment. Each of the one or more directions may be identified by a particular direction (or angle) and a degree of confidence as to the particular source of sound.

In one embodiment, the one or more directions may be determined using sound source localization. Sound source localization techniques may be used to localize the direction of a sound source by detecting time differences in the arrival time of different sounds due to the speed of sound being captured by a plurality of microphones. Sound source localization techniques may also include performing pattern matching on each of the audio signals received by each of the plurality of microphones. The one or more directions may be represented by a one-dimension localization (e.g., an angle representing a plane in which a particular source of sound is located), two-dimension localization (e.g., a vector representing an angle and an elevation), or a three-dimension localization (e.g., a point in three-dimension space associated with a particular source of sound).

In step 578, one or more audio recordings based on the one or more sounds are generated. Each of the one or more audio recordings may be associated with a different direction of the one or more directions. In one embodiment, each of the one or more audio recordings includes audio information associated with a different person within the first environment.

In some embodiments, beamforming techniques may be performed in order to amplify sounds originating from a particular direction (or location) and to suppress sounds originating from other directions. Beamforming allows a plurality of microphones (e.g., comprising a microphone array) to function as a steerable directional microphone. In some cases, the beamforming techniques may include time shifting and combining audio signals associated with a plurality of microphones. The degree of time shifting may be based on a particular location associated with a particular source of sound. Sound focusing techniques are particularly useful when more than one person is speaking at the same time within an environment.

In step 579, the one or more audio recordings generated in step 578 are outputted. In one embodiment, the one or more audio recordings are outputted to a local speech recognition engine for speech to text processing.

Figure 5E:
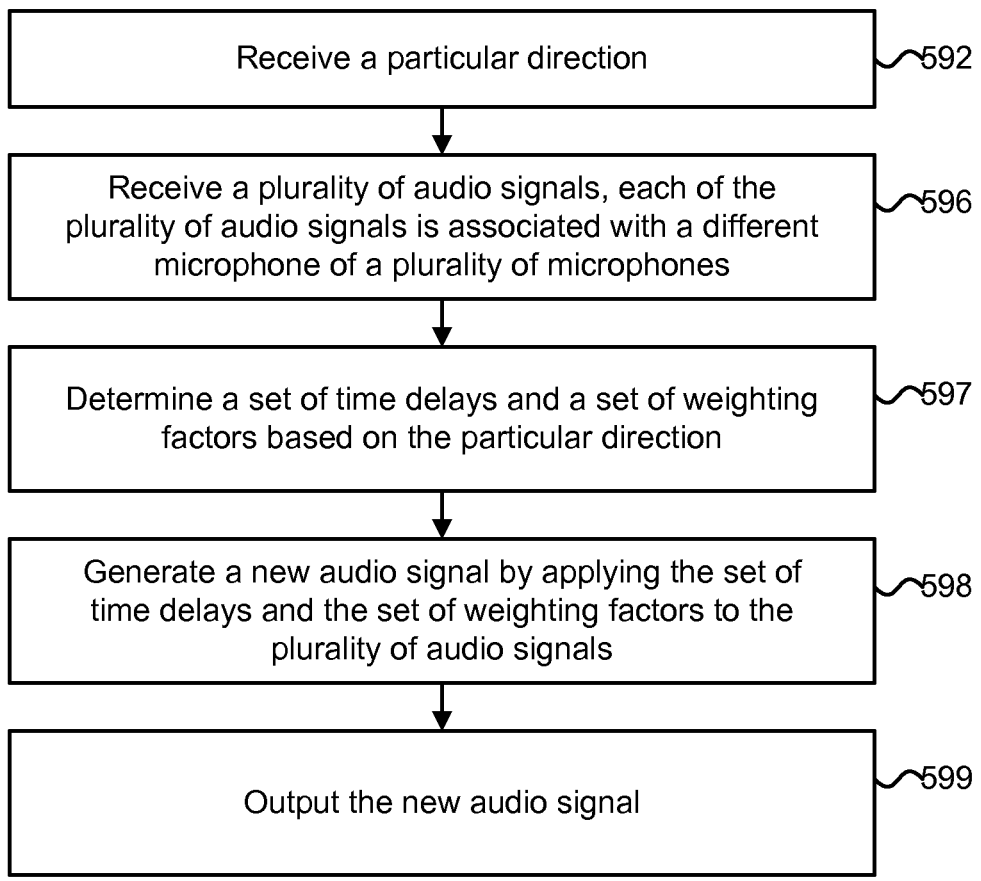
FIG. 5E is a flowchart describing one embodiment of a process for generating one or more audio recordings.

FIG. 5E is a flowchart describing one embodiment of a process for acquiring one or more audio recordings. The process described in FIG. 5E is one example of a process for implementing step 508 in FIG. 5B, for implementing step 556 in FIG. 5C, or for implementing step 578 in FIG. 5D. The process of FIG. 5E may be performed continuously and by one or more computing devices. Each step in the process of FIG. 5E may be performed by the same or different computing devices as those used in other steps, and each step need not necessarily be performed by a single computing device. In one embodiment, the process of FIG. 5E is performed by a target detection and tracking system such as target detection and tracking system 10 in FIGS. 2-3.

In step 592, a particular direction is received. In step 596, a plurality of audio signals is received. Each of the plurality of audio signals may be associated with a different microphone of a plurality of microphones. In step 597, a set of time delays and a set of weighting factors based on the particular direction received in step 592 are determined. The set of time delays and the set of weighting factors may be determined based on a spatial arrangement of the plurality of microphones and the arrival time differences of sounds originating from the particular direction to each of the plurality of microphones.

In step 598, a new audio signal is generated by applying the set of time delays and the set of weighting factors to the plurality of audio signals. In some embodiments, a new audio signal is generated by applying audio signal processing techniques to the plurality of audio signals received in step 596 such that sounds originating from the particular direction received in step 592 are amplified (e.g., via constructive interference) while other sounds originating from another direction are attenuated (e.g., via destructive interference). The audio signal processing techniques may combine time shifted versions of each of the plurality of audio signals in order to isolate sounds originating from the particular direction from other sounds within an environment. In one example, the new audio signal may be generated by applying delay and sum beamforming techniques whereby each of the plurality of audio signals may be delayed relative to each other prior to performing a weighted sum of the plurality of audio signals. The amount of delay may determine a beam angle at which a beamformer "listens."

In step 599, the new audio signal is outputted. The new audio signal may be stored and outputted as a new audio recording. In one embodiment, a plurality of new audio signals are generated and outputted as a plurality of audio recordings in parallel.

Figure 6:
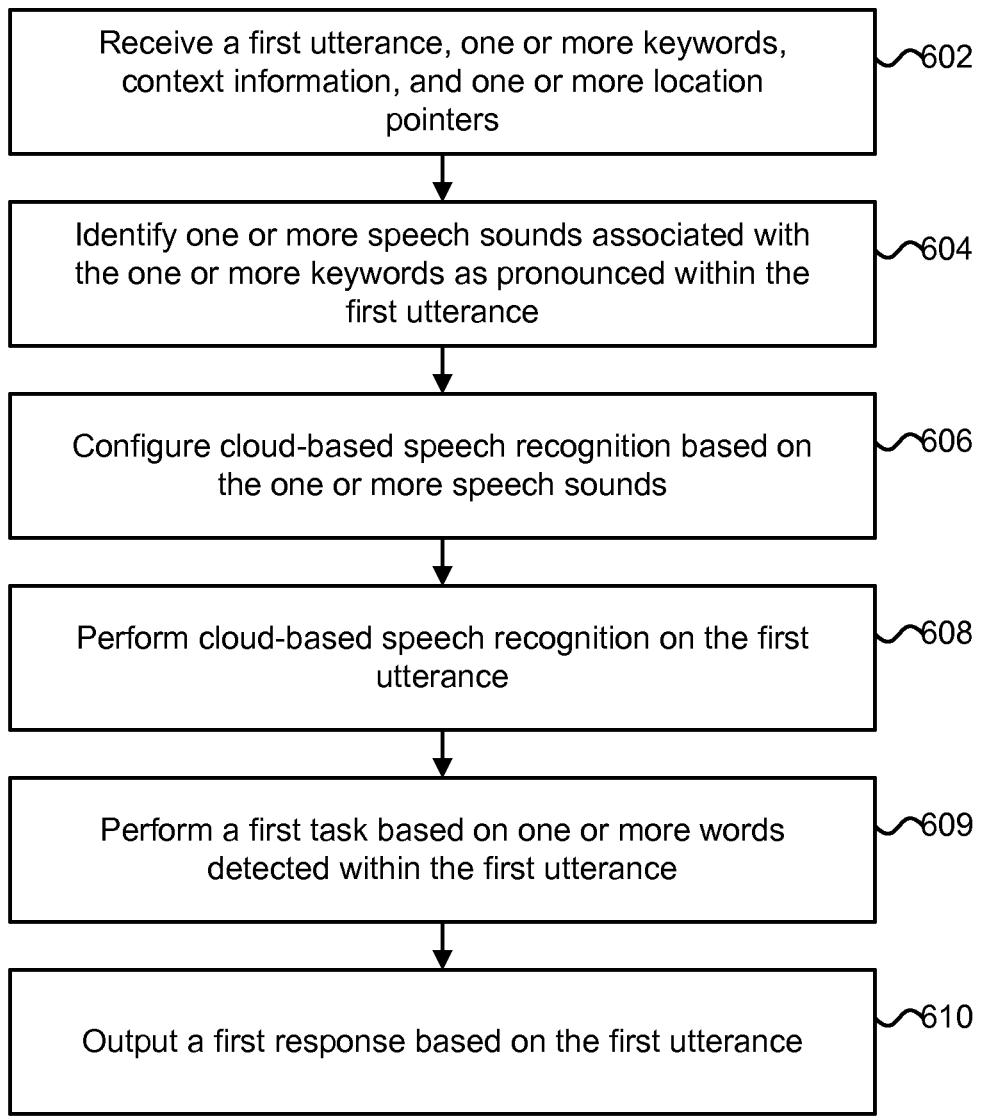
FIG. 6 is a flowchart describing one embodiment of a process for performing cloud-based speech recognition.

FIG. 6 is a flowchart describing one embodiment of a process for performing cloud-based speech recognition. The process of FIG. 6 may be performed continuously and by one or more computing devices. Each step in the process of FIG. 6 may be performed by the same or different computing devices as those used in other steps, and each step need not necessarily be performed by a single computing device. In one embodiment, the process of FIG. 6 is performed by an Internet accessible application server such as application server 150 in FIG. 1.

In step 602, a first utterance and one or more keywords are received. The one or more keywords received in step 602 may include a phrase such as "Xbox Bing" or "search the Internet for." Context information determined in step 514 of FIG. 5A and one or more location pointers determined in step 512 of FIG. 5A may also be received. In step 604, one or more speech sounds associated with the one or more keywords as pronounced within the first utterance are identified. In one example, speech sounds unique to a particular person and associated with the one or more keywords may be identified within the first utterance by applying traditional speech to text processing techniques to the first utterance and then comparing the detected words with the one or more keywords.

In some embodiments, location information associated with the one or more keywords may be used in order to help locate the one or more keywords within the first utterance. In one example, one or more location pointers may be received and used to help identify the location of the one or more keywords within the first utterance. The one or more location pointers may comprise time offsets referenced from the beginning of the first utterance.

In step 606, a cloud-based speech recognition engine is configured based on the one or more speech sounds identified in step 604. In one embodiment, the cloud-based speech recognition engine may adapt to a voice pattern associated with the pronunciation of the one or more keywords within the first utterance prior to performing the cloud-based speech recognition step in step 608. In some cases, the cloud-based speech recognition engine may adapt to sounds associated with a particular speaker by updating one or more acoustic models prior to performing step 608. In step 608, cloud-based speech recognition is performed on the first utterance. In one example, a list of one or more words detected within the first utterance may be generated. In step 609, a first task based on one or more words detected in step 608 is performed. The first task may include performing an Internet search based on the one or more words detected within the first utterance. In step 610, a first response based on the first utterance is outputted. The first response may include the one or more words detected within the first utterance or search results associated with the one or more words.

In some embodiments, search results generated from the one or more words detected within the first utterance may be refined based on the context information received in step 602. For example, a particular person may request an Internet search be performed using the terms "Harry Potter" by saying the utterance "search the Internet for Harry Potter." If a generic application is being executed on the computing device running the local speech recognizer (or engine), then a generic Internet search may be performed using only the terms "Harry Potter." However, if a special application (e.g., a games marketplace application) is being executed on the computing device running the local speech recognizer, then a modified search may be performed, for example, by executing an Internet search using the terms "Harry Potter games." In some cases, the generic search results may be filtered or weighted using the context information received in step 602.

Figure 7:
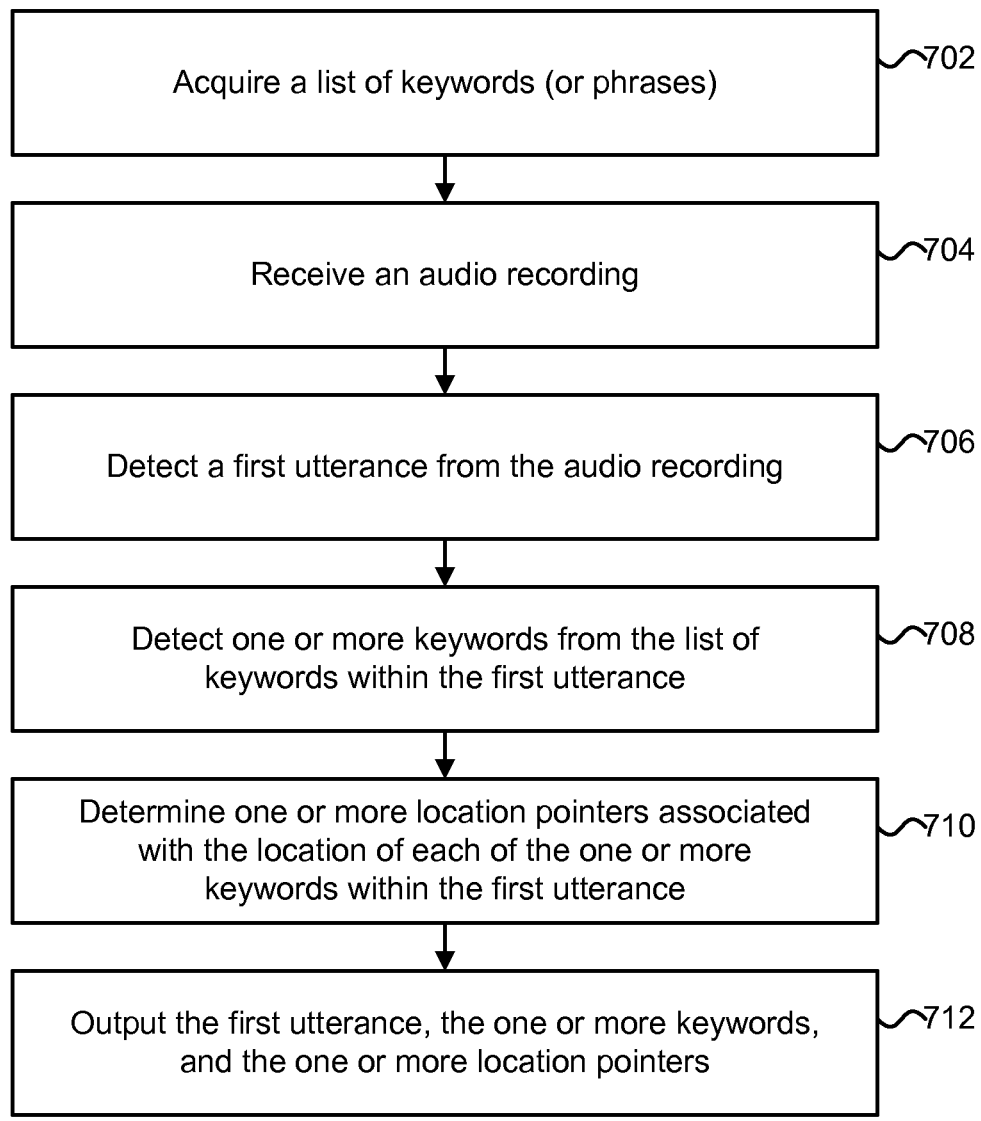
FIG. 7 is a flowchart describing one embodiment of a process for performing local speech recognition.

FIG. 7 is a flowchart describing one embodiment of a process for performing local speech recognition. The process described in FIG. 7 is one example of a process for implementing step 512 in FIG. 5A. The process of FIG. 7 may be performed continuously and by one or more computing devices. Each step in the process of FIG. 7 may be performed by the same or different computing devices as those used in other steps, and each step need not necessarily be performed by a single computing device. In one embodiment, the process of FIG. 7 is performed by a target detection and tracking system such as target detection and tracking system 10 in FIGS. 2-3.

In step 702, a list of keywords is acquired. The list of keywords may include one or more keywords or phrases such as "call," "purchase," "search the Internet for," or "search my email for." The list of keywords may be included within a local grammar file (or keyword constraint file) and may be associated with a particular application. For example, a first list of keywords may be activated when a first application is active and deactivated when the first application is paused or closed. In step 704, an audio recording is received. In some cases, the audio recording may be acquired by utilizing step 510 in FIG. 5A.

In step 706, a first utterance is detected from the audio recording. The first utterance may be detected (or identified) via decaying beamformer confidence (e.g., by detecting threshold changes in a confidence level of a speech signal included within the audio recording in order to determine when a person has stopped talking) or via detection of periods of time during which a speech signal included within the audio recording is deemed to be silent (e.g., by detecting silence before and after a spoken phrase lasting longer than a predetermined duration). Other speech detection techniques may also be applied to the audio recording in order to determine a starting endpoint and a stopping endpoint for the first utterance.

In one embodiment, a voice activity detector (VAD) is used to detect a first utterance by processing an audio recording associated with a particular listening direction. In this case, the speech detection techniques are applied only to sounds originating from the particular listening direction as sounds originating from other directions are suppressed. This is in contrast to typical VADs in which speech processing is performed on sounds originating from anywhere within a playspace. One advantage of applying speech detection techniques to the audio recording associated with a particular listening direction is that the first utterance may be detected even if a plurality of people are speaking within the playspace at the same time. For example, if a playspace included a first game player and a second game player both talking at the same time, then a first audio recording may be generated associated with a first direction of the first game player, and a second audio recording may be generated associated with a second direction of the second player. By applying speech detection techniques to the first audio recording, a first utterance associated with the first game player may be detected even though the second game player is talking at the same time as the first game player. Similarly, by applying speech detection techniques to the second audio recording, a second utterance associated with the second game player may also be detected even though the first game player is talking at the same time as the second game player.

In step 708, one or more keywords from the list of keywords acquired in step 702 are detected within the first utterance. The one or more keywords may be detected within the first utterance by applying traditional speech to text processing techniques to the first utterance and then comparing the detected words with the one or more keywords. The one or more keywords may also be detected within the first utterance by applying pattern matching techniques to audio signals associated with the first utterance and the one or more keywords. In step 710, one or more location pointers associated with the location of each of the one or more keywords within the first utterance may be determined. Each of the one or more location pointers may be represented by a time offset from the start of the first utterance. In some cases, the one or more location pointers may point to locations in the middle of the first utterance (i.e., the keywords of interest may be in the middle of the first utterance). In step 712, the first utterance determined in step 706 and the one or more keywords detected in step 708 are outputted. The one or more location pointers determined in step 710 may also be outputted. In one example, the first utterance, the one or more keywords, and the one or more location pointers may be transmitted to a second computing device.

Figure 8:
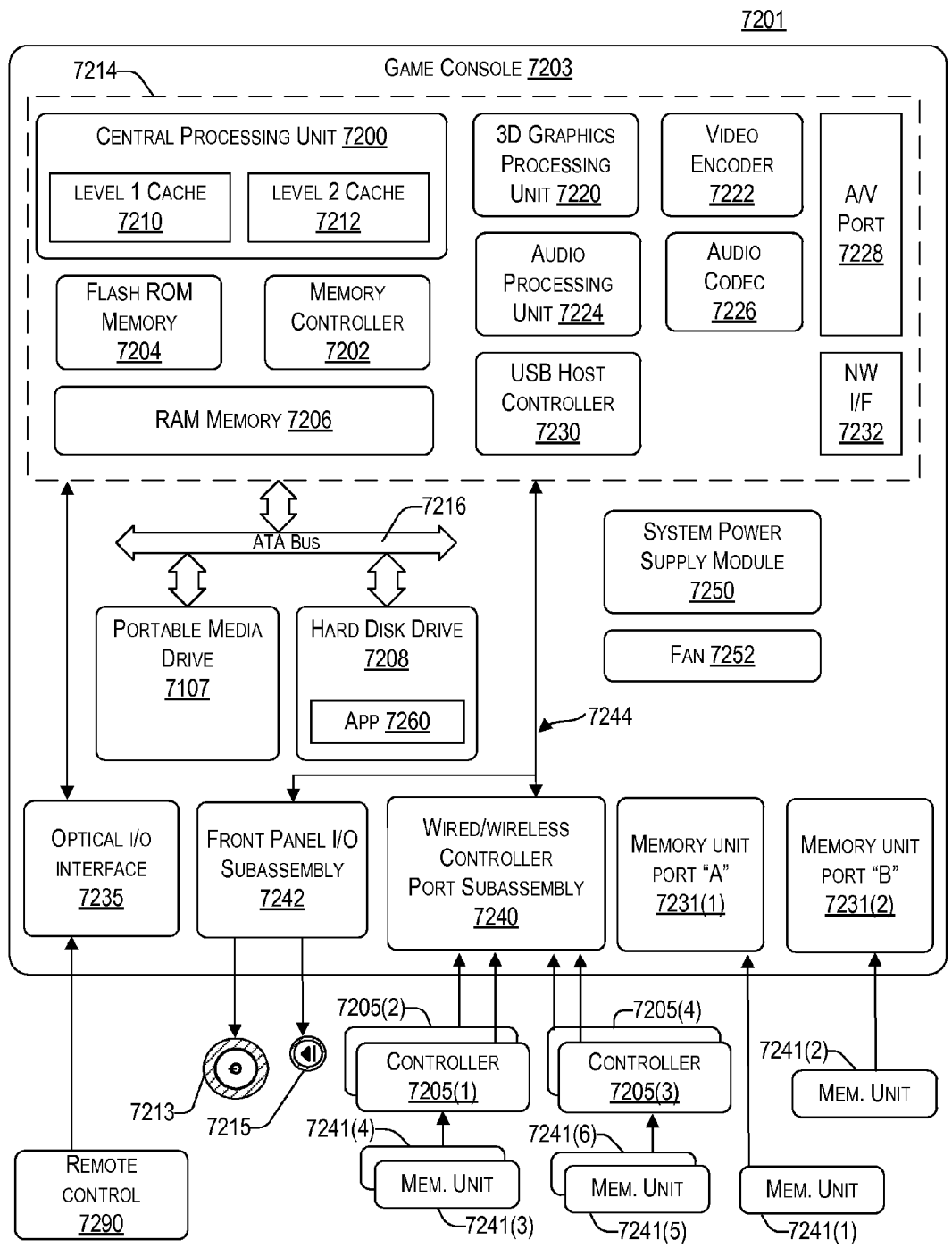
FIG. 8 is a block diagram of an embodiment of a gaming and media system.
Figure 9:
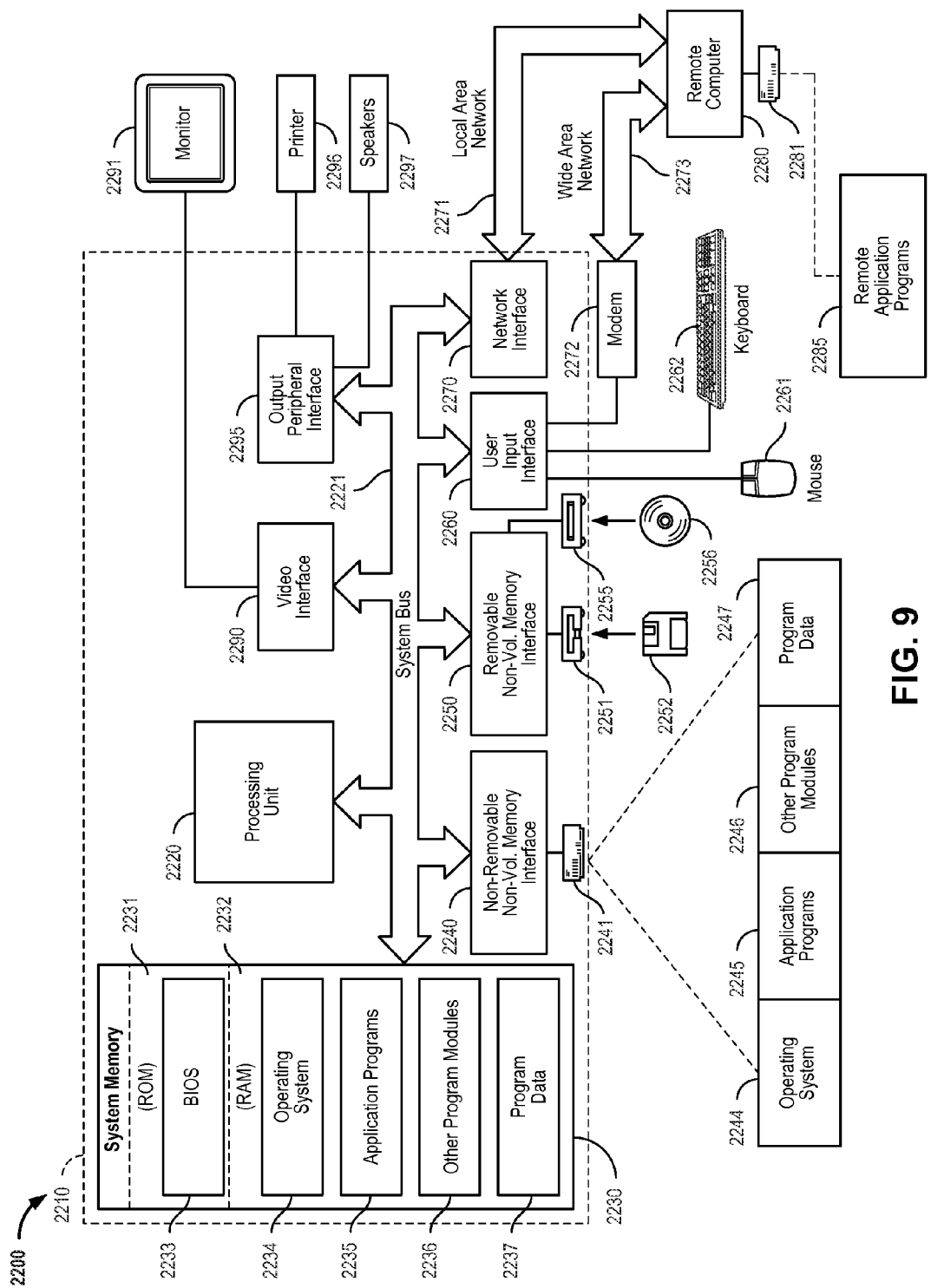
FIG. 9 is a block diagram of an embodiment of a computing system environment.

The disclosed technology may be used with various computing systems. FIGS. 8-9 provide examples of various computing systems that can be used to implement embodiments of the disclosed technology.

FIG. 8 is a block diagram of an embodiment of a gaming and media system 7201, which is one example of computing environment 12 in FIG. 3. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of an embodiment of a computing system environment 2200, which is one example of computing environment 12 in FIG. 3. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 9 illustrates operating system 2234, application programs 2235, other program modules 2236, and program data 2237.

The computer 2210 may also include other removable/non-removable, volatile/nonvolatile computer storage media. By way of example only, FIG. 9 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 9, provide storage of computer readable instructions, data structures, program modules and other data for the computer 2210. In FIG. 9, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 9. The logical connections depicted in FIG. 9 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 9 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing speech recognition, comprising:

acquiring a plurality of audio signals from a plurality of microphones, each of the plurality of audio signals is associated with a different microphone of the plurality of microphones, the plurality of audio signals is associated with a first environment;

determining one or more directions within the first environment, the first environment includes one or more persons, each of the one or more directions is associated with a different person of the one or more persons;

acquiring one or more images of the first environment using a capture device, the plurality of audio signals are associated with the first environment during a first period of time, the one or more images are associated with the first environment during the first period of time, the one or more images include one or more depth images, the determining one or more directions includes performing skeletal tracking based on the one or more images for each of the one or more persons;

generating one or more audio recordings based on the plurality of audio signals, a first audio recording of the one or more audio recordings is generated by applying audio signal processing techniques to the plurality of audio signals such that sounds originating from a first direction of the one or more directions are amplified while other sounds originating from one or more other directions are attenuated;

performing local speech recognition on each of the one or more audio recordings, the performing local speech recognition includes detecting a first utterance and detecting one or more keywords within the first utterance, the first utterance is detected by applying one or more speech detection techniques to the first audio recording of the one or more audio recordings;

transmitting the first utterance and the one or more keywords to a second computing device, the second computing device performs a speech recognition technique on the first utterance, the speech recognition technique detects one or more words within the first utterance; and receiving a first response from the second computing device based on the first utterance.

2. The method of claim 1, wherein:
the second computing device identifies one or more speech sounds associated with the one or more keywords as pronounced within the first utterance, the second computing device adapts the speech recognition technique based on the one or more speech sounds; and
the first response includes text information associated with the one or more words detected within the first utterance by the second computing device.

3. The method of claim 1, wherein:
the transmitting the first utterance and the one or more keywords includes transmitting an audio file associated with the first utterance and transmitting text information associated with the one or more keywords to the second computing device; and
the first utterance is detected by applying one or more voice activity detection techniques to the first audio recording.

4. The method of claim 1, further comprising:
transmitting one or more location pointers associated with the one or more keywords to the second computing device, the detecting one or more keywords within the first utterance includes determining the one or more location pointers within the first utterance.

5. The method of claim 1, further comprising:
performing echo cancellation on the plurality of audio signals prior to the determining one or more directions.

6. The method of claim 1, wherein:
the determining one or more directions includes performing sound source localization, the performing sound source localization includes determining an angle and a degree of confidence associated with each of the one or more persons.

7. The method of claim 1, wherein:
the first audio recording is generated in response to determining that a first person of the one or more persons is facing a particular direction, the determining that a first person of the one or more persons is facing a particular direction includes determining that a face of the first person is facing towards the capture device.

8. The method of claim 1, wherein:
the generating one or more audio recordings includes performing beamforming techniques for each of the one or more directions.

9. The method of claim 1, further comprising:
determining context information associated with a first computing device, the performing local speech recognition is performed on the first computing device; and
transmitting the context information to the second computing device.

10. The method of claim 9, wherein:
the context information includes identification of a particular application running on the first computing device.

11. The method of claim 1, further comprising:
determining context information associated with a particular person of the one or more persons; and
transmitting the context information to the second computing device.

12. The method of claim 11, wherein:
the context information includes profile information associated with the particular person.

13. The method of claim 12, wherein:
the performing local speech recognition is performed on a mobile computing device; and
the first response includes Internet search results based on the first utterance and the context information.

14. An electronic device for integrating local and cloud-based speech recognition, comprising:
a capture device including a plurality of microphones, the capture device acquires one or more sounds from the plurality of microphones, the one or more sounds are associated with a first environment, the first environment includes one or more persons, the capture device acquires one or more images of the first environment, the one or more images include one or more depth images; and
one or more processors, the one or more processors determine one or more directions within the first environment by performing skeletal tracking based on the one or more depth images for each of the one or more persons, each of the one or more directions is associated with a different person of the one or more persons, the one or more processors generate one or more audio recordings based on the one or more sounds, each of the one or more audio recordings is associated with a different direction of the one or more directions, the one or more processors detect a first utterance within a first audio recording of the one or more audio recordings by applying one or more speech detection techniques to the first audio recording, the one or more processors detect one or more keywords within the first utterance, the one or more processors transmit the first utterance and the one or more keywords to a second computing device, the second computing device performs a speech recognition technique on the first utterance based on the one or more keywords, the speech recognition technique detects one or more words within the first utterance, the one or more processors receive a first response from the second computing device based on the first utterance.

15. The electronic device of claim 14, wherein:
the second computing device identifies one or more speech sounds associated with the one or more keywords as pronounced within the first utterance, the second computing device adapts the speech recognition technique based on the one or more speech sounds.

16. The method of claim 15, wherein:
the one or more processors identify a particular application being executed on the electronic device, the one or more processors transmit identification information associated with the particular application to the second computing device, the second computing device performs an Internet search based on the identification information and the one or more words detected within the first utterance; and
the first response includes Internet search results based on the identification information and the first utterance.

17. One or more storage devices containing processor readable code for programming one or more processors to perform a method for integrating local and cloud-based speech recognition comprising the steps of:
receiving one or more sounds from a plurality of microphones, the one or more sounds are associated with a first environment during a first time period;
receiving one or more depth images of the first environment, the one or more depth images are associated with the first environment during the first time period;
determining one or more locations within the first environment, the first environment includes one or more persons, each of the one or more directions is associated with a different person of the one or more persons, the determining one or more locations includes performing skeletal tracking based on the one or more depth images for each of the one or more persons;

generating one or more audio recordings based on the one or more sounds, each of the one or more audio recordings is associated with a different location of the one or more locations;

performing local speech recognition on each of the one or more audio recordings, the performing local speech recognition includes detecting a first utterance and detecting one or more keywords within the first utterance, the first utterance is detected by applying one or more speech detection techniques to a first audio recording of the one or more audio recordings;

transmitting the first utterance and the one or more keywords to a second computing device, the second computing device performs a speech recognition technique on the first utterance based on the one or more keywords, the speech recognition technique detects one or more words within the first utterance; and receiving a first response from the second computing device based on the first utterance.

18. The one or more storage devices of claim 17, wherein:
the second computing device identifies one or more speech sounds associated with the one or more keywords as pronounced within the first utterance, the second computing device configures the speech recognition technique based on the one or more speech sounds.

19. The one or more storage devices of claim 18, wherein:
the determining one or more locations includes performing sound source localization, the performing sound source localization includes determining an angle and a degree of confidence associated with each of the one or more persons; and the generating one or more audio recordings includes performing beamforming techniques for each of the one or more directions.

\* \* \* \* \*